H. DOCK.
PISTON.
APPLICATION FILED MAY 7, 1909. RENEWED JUNE 8, 1911.

1,014,052.

Patented Jan. 9, 1912.

Witnesses.
Fred M. Dannenfelser
Chas. M. Peard

Inventor
HERMAN DOCK.
By his Attorneys.

UNITED STATES PATENT OFFICE.

HERMAN DOCK, OF WESTERLY, RHODE ISLAND, ASSIGNOR, BY MESNE ASSIGNMENTS, TO ALFRED A. WHITMAN, OF NEW YORK, N. Y.

PISTON.

1,014,052.  Specification of Letters Patent.  Patented Jan. 9, 1912.

Application filed May 7, 1909, Serial No. 494,631. Renewed June 8, 1911. Serial No. 632,020.

*To all whom it may concern:*

Be it known that I, HERMAN DOCK, a citizen of the United States, residing at Westerly, county of Washington, State of Rhode Island, have invented certain new and useful Improvements in Pistons, of which the following is a full, clear, and exact description.

My invention relates to a new and useful improvement in piston and connecting rod construction particularly adapted to engines of the internal combustion type.

The invention is essentially an improvement upon the construction set forth in my former Patent No. 843,004, dated February 5, 1907.

Figure 1:
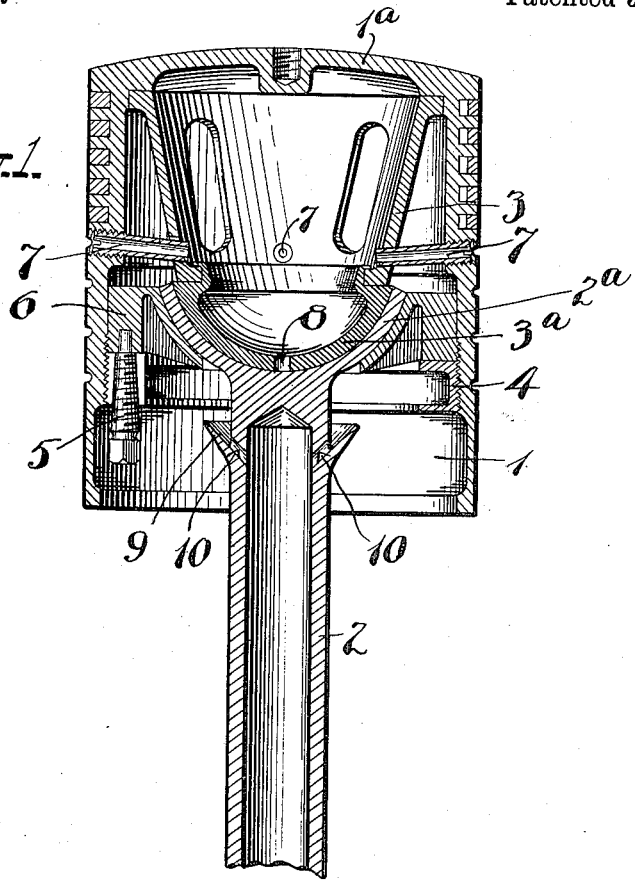
Figure 2:
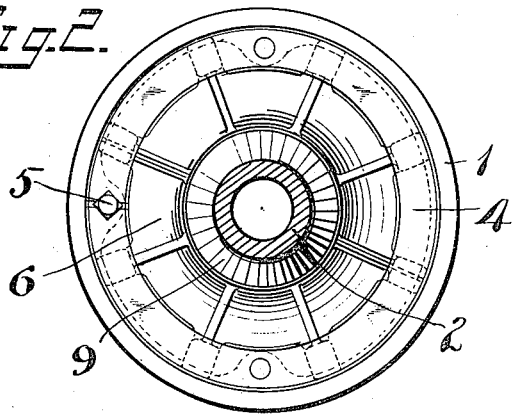

In the accompanying drawings, Figure 1 is a longitudinal section of a piston and a portion of a connecting rod associated therewith. Fig. 2 is a view of the under side of the parts shown in Fig. 1.

1 represents the piston, which is in the form of a cylindrical shell closed at the upper end, as at the head $1^a$.

2 represents a connecting rod.

3 represents an inverted dome like member, the lower end of which furnishes a semi-spherical bearing $3^a$.

The upper end of the connecting rod 2 is provided with a cupped bearing $2^a$ designed to fit upon the semi-spherical bearing $3^a$ at the lower end of the dome 3.

4 is a retaining ring split at one side whereby the same may be expanded by a tapered screw 5, the inner wall of the piston shell 1 is threaded around the ring 4 and the latter is correspondingly threaded whereby it may be adjusted up and down before the screw 5 is set in.

6 is an annular under bearing which engages the lower wall of the cupped portion $2^a$ of the connecting rod 2, whereby the cupped bearing end of said connecting rod is forced into the proper degree of contact with the bearing head $3^a$ of the dome 3. The position of the under bearing 6 and the degree of snugness between the parts 6, $2^a$ and $3^a$ may be adjusted by the ring 4.

The dome 3, as will be observed, is lightly constructed and yet is of such shape as to withstand the most severe pressures. It will also be observed that its upper edge engages with the piston 1 directly under the head $1^a$; in other words, power applied to the head of the piston is transmitted directly therefrom (instead of from an intermediate part of the piston) to the upper end of the connecting rod 2, thereby reducing wear on the side walls of the piston or upon the side walls of the cylinder containing the piston.

7—7 are oil ducts leading from the external side walls of the piston 1 to the interior of the dome 3, whereby oil will be conducted to the lower end of said dome.

8 is an oil passage from the lower inner side of the dome to the concaved end of the cupped bearing $2^a$.

Oil supplied to the cylinder containing the piston, of necessity, works through the duct 7, thence to the bearing surface between the bearing $3^a$ and the cupped end $2^a$ of the piston. Any overflow, as is bound to occur, works to the outside of the cup $2^a$ thence down between the outer wall of the cup and the annular under bearing 6. From thence, surplus oil drops to an annular cupped flange 9 on the connecting rod 2. 10—10 are ducts leading therefrom to the interior of the connecting rod (which is preferably hollow) down through which the surplus oil passes to lubricate the lower bearing box (provided at the lower end of every connecting rod) to lubricate the latter where the same is connected to the crank shaft.

The piston 1 may be machined externally and internally; may be provided with the usual piston rings and may in all respects be designed to meet the particular conditions found in the particular engine to which the piston is to be applied. The structure is extremely light and yet strong and durable. The design is such that the thrust is transmitted directly from the upper end of the piston to the connecting rod, thus avoiding in a large measure so-called "piston-slap" and undue side wear.

The dome may be made of a single piece of suitable metal, or, if desired, its lower end or bearing $3^a$ may be formed of a metal best adapted to withstand the wear of the working part $2^a$.

The connection between the parts 1 and 2 is universal in character whereby the angular position of the piston on the connecting rod 2 will not make the slightest difference in the operation of the apparatus.

While, in a large measure, many of the features of this improved construction are dominated by my former patent above referred to, structurally the present invention possesses many practical advantages inuring to the benefit of both the manufacturer and user.

It will be observed that the passage through the annular under bearing 6 is sufficient to afford a suitable amount of clearance for the body of the connecting rod 2, whereby the same may be oscillated to the necessary extent, as the lower end of the latter follows the crank pin (not shown).

What I claim is:

1. In an apparatus of the character described, a piston of hollow cylindrical cross section closed at its upper end, an inverted dome-shaped bearing extending from a point well above the center of the piston down to a point approximately midway in the length of the piston, the bearing end of said dome being of semi-spherical shape, a piston having a cupped-shape head, the concave bearing surface thereof corresponding in shape and size to the semi-spherical bearing end of said inverted dome, and means to hold said connecting rod bearing in operative engagement against the bearing end of the dome.

2. In an apparatus of the character described, a piston of hollow cylindrical cross section closed at its upper end, an inverted dome-shaped bearing extending from a point well above the center of the piston down to a point approximately midway in the length of the piston, the bearing end of said dome being of semi-spherical shape, a piston having a cupped-shape head, the concave bearing surface thereof corresponding in shape and size to the semi-spherical bearing end of said inverted dome, means to hold said connecting rod bearing in operative engagement against the bearing end of the dome, said means comprising an annular under bearing and an adjusting device coöperating therewith and operatively connecting said annular under bearing with the inner side wall of the piston.

3. The combination with a connecting rod having a cupped bearing face at one end, of a piston having a similarly curved but convexed bearing face, upon which said rod has its bearing, an oil duct leading from the side of the piston to the upper side of the convexed bearing, the latter having an oil passage communicating with the concaved bearing face of the cupped end of the connecting rod.

4. The combination with a connecting rod having a cupped bearing face at one end, of a piston having a similarly curved but convexed bearing face, upon which said rod has its bearing, an oil duct leading from the side of the piston to the upper side of the convexed bearing, the latter having an oil passage communicating with the concaved bearing face of the cupped end of the connecting rod, said connecting rod having a longitudinal oil passage therein, and means carried by the connecting rod for catching surplus oil from the cupped bearing and conducting the same to the longitudinal passage in said connecting rod.

HERMAN DOCK.

Witnesses:
J. M. W. Shepherd,
Albert S. Wood.